Oct. 23, 1962 B. S. WILDI ET AL 3,060,253
THERMOELECTRIC DEVICE
Filed Feb. 29, 1960 3 Sheets-Sheet 1

FIGURE I.

*INVENTORS*
BERNARD S. WILDI
JOHN E. KATON
*BY* Lloyd B. Stevens, Jr.
ATTORNEY

*INVENTORS*
BERNARD S. WILDI
JOHN E. KATON
*BY* Lloyd B. Stevens, Jr.
ATTORNEY

Oct. 23, 1962 B. S. WILDI ET AL 3,060,253

THERMOELECTRIC DEVICE

Filed Feb. 29, 1960 3 Sheets-Sheet 3

INVENTOR.
BERNARD S. WILDI
JOHN E. KATON
BY Lloyd B. Stevens, Jr.
ATTORNEY

United States Patent Office 3,060,253

Patented Oct. 23, 1962

3,060,253
THERMOELECTRIC DEVICE

Bernard S. Wildi and John E. Katon, Dayton, Ohio, assignors to Monsanto Chemical Company, St. Louis, Mo., a corporation of Delaware Filed Feb. 29, 1960, Ser. No. 11,717
10 Claims. (Cl. 136—5)

The invention relates to organic semiconductor thermoelectric devices. More particularly the invention involves pyrolyzed pyromellitonitrile/alcohol reaction product bodies or components or elements useful in thermoelectric devices. These bodies can suitably be in the form of discs, wafers, bars, rods, rectangular parallelepipeds, round, or most any geometric shape.

It is well known in the art to employ certain inorganic materials or thermoelectric components; however, few, if any, suitable organic materials have previously been known. It has now been discovered that a certain other new type of organic material is useful for this purpose. These materials which are pyrolyzed pyromellitonitrile/lower alkyl alcohol reaction product are described in detail in copending application Serial No. 11,897, filed concurrently herewith. The reaction products from which the pyrolyzed products are made contain substantially two moles of methanol (or other lower alkyl alcohol) per mole of pyromellitonitrile. The pyrolyzed product is produced by heating the almost colorless greenish-blue solid product or pellets made therefrom, preferably in the presence of an inert atmosphere or under high vacuum at a temperature at least about 160–170° C., preferably in the range of about 200–700° C.

It is an object of this invention to provide new and useful thermoelectric devices.

It is another object of this invention to provide new and useful thermoelectric devices for generating direct current power.

It is another object of this invention to provide new and useful devices for cooling thermoelectrically.

These and other objects of the invention will become apparent as the detailed description of the invention proceeds.

In making the thermoelectric bodies of the invention pyromellitonitrile, a new compound described in copending application Serial No. 696,026, filed November 13, 1957, now abandoned, is used. As has been stated hereinabove pyrolyzed pyromellitonitrile/lower alcohol reaction products are described in copending application Serial No. 11,897, filed concurrently herewith and also described in this copending application are semiconductor bodies made from the pyrolyzed material. The invention will be more clearly understood from the following detailed description of specific examples thereof read in conjunction with the accompanying drawings wherein:

EXAMPLE 1

Figure 1:
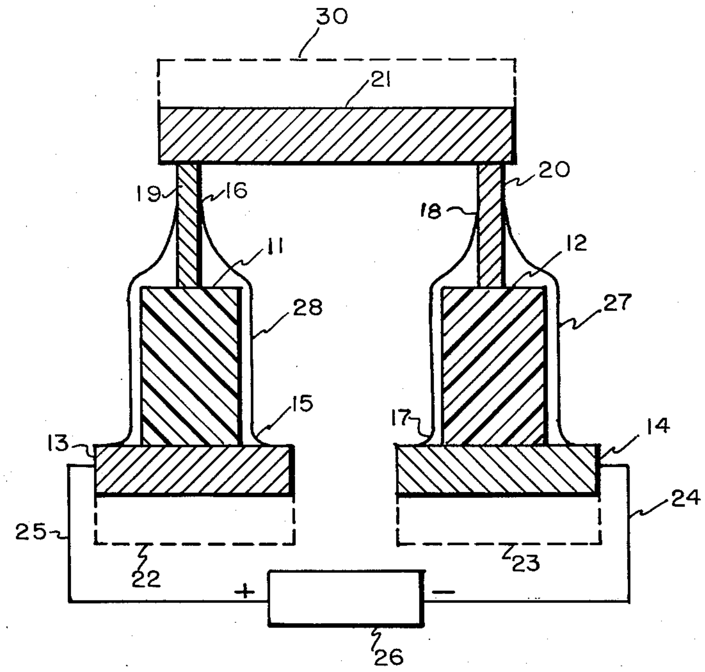
FIGURE 1 is an elevational view partially in section of one embodiment of the invention.

This example describes the preparation of a pyromellitonitrile/methanol reaction product and pyrolyzed material made therefrom.

A sample of 30 g. of pyromellitonitrile and four pints of absolute methanol was refluxed for 24 hours. The solution became dark-blue in color. The temperature of reaction must be less than about 160° C. and is preferably less than about 125° C. The solution was filtered out and a small amount of solid was obtained. The greenish-yellow filtrate was cooled in an ice bath and filtered to recover a light greenish-yellow solid. This solid product weighing 17.35 g. does not melt but starts to change color at 145–155° C., turns black greenish at 160–165° C. and by 200° C. has turned purplish-black.

A sample of 16.2 g. of the 17.35 g. of material was subjected to sublimation treatment at 265° C./0.8–0.2 mm. of Hg absolute pressure for 18 hours. The weight of residue material recovered after this sublimation treatment was 12.3 g.

EXAMPLE 2

This example describes the heat treatment and thermoelectrical testing of pellets of the pyrolyzed pyromellitonitrile/methanol reaction product of Example 1. The results of these heat treating and thermoelectric testing experiments are reported below in Table I. Also reported are resistivity measurements made on the samples.

*Table I*

| Sample No. | Thickness, mm. | Weight, gm. | Thermoelectric power (TEP), μv./° C. | Resistivity (ρ), ohm-cm | Cumulative percent Weight Loss |
|---|---|---|---|---|---|
| I | 0.6 | 0.0792 | ---------- | ---------- | ---------- |
| II | 0.7 | 0.0985 | ---------- | ---------- | ---------- |
| III | 0.5 | 0.0724 | ---------- | ---------- | ---------- |
| | Samples heated at 476° C./0.09 mm. for 4 hrs. | | | | |
| I | ---------- | 0.0707 | −6.1 | 7.5×10³ | 10.7 |
| II | ---------- | 0.0900 | −9.5 | 5.0×10³ | 8.6 |
| III | ---------- | 0.0642 | −11.0 | 1.2×10³ | 11.3 |
| | Samples heated at 500° C./0.09 mm. for 16 hrs. | | | | |
| I | ---------- | 0.0692 | −18.0 | 4.1×10³ | 12.7 |
| II | ---------- | 0.0867 | −18.0 | 2.8×10³ | 12.0 |
| | Samples heated at 560° C./0.09 mm. for 18 hrs. | | | | |
| I | ---------- | 0.0672 | −16.2 | 1.5×10³ | 15.2 |
| II | ---------- | 0.0850 | −20.0 | 8.5×10² | 13.7 |
| | Sample heated at 660° C./0.1 mm. for 24 hrs. | | | | |
| I | ---------- | 0.0597 | +20.0 | 3.2×10² | 24.6 |

The samples or pellets tested, i.e. I, II and III were made at pressures of 5500 kg./sq. cm. using the powdered pyrolyzed product of Example 1 in a die having dimensions 22 x 4.6 mm. The thickness of each wafer is shown in Table I. The formation of the wafers was carried out at room temperature.

The thermoelectric testing, results of which are described above in Table I, was carried out in the following fashion: Each wafer to be tested was placed on a gold plated copper plate which served as the cold (about 23° C.) electrode of the thermoelectric generator. The hot electrode for the generator was a soldering iron having a gold plated tip which was mounted in a jig and could be raised or lowered by a screw arrangement. Three measurements were taken at different points on each of these samples and averaged for the thermoelectric powers reported in Table I. During the measurement the soldering iron was pressed against the upper surface of the sample with sufficient pressure being applied to give good ohmic contact both for the soldering iron and the gold plated copper plate with the samples. The series electrical circuit was completed from the gold plated copper plate through the galvanometer back to the soldering iron through the gold plated tip through the sample back to the copper plate. In the test the hot probe was heated to approximately 105–110° C. above the temperature of the cold plate before being applied to the wafer or disc. The actual hot probe and cold plate temperatures were measured by thermocouple. For each reading the apparatus was allowed to come to equilibrium and the highest voltage generated was noted. Although the pyrolyzed wafers have very good thermo-insulating powers, if the hot probe is maintained in contact with the sample over a long period of time the cold copper electrode tends to approach the temperature of the hot probe due to heat of conduction through the sample. Thermoconductivities of the samples are of the order of 0.003–0.004 cal./cm.-sec.-° C.

Figure 3:
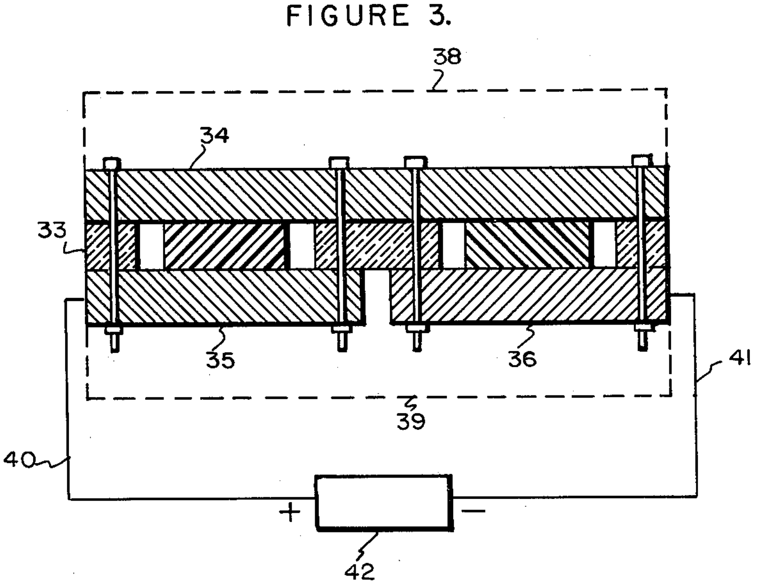
FIGURE 3 is an elevational view partially in section of the same embodiment as FIGURE 2.
Figure 4:
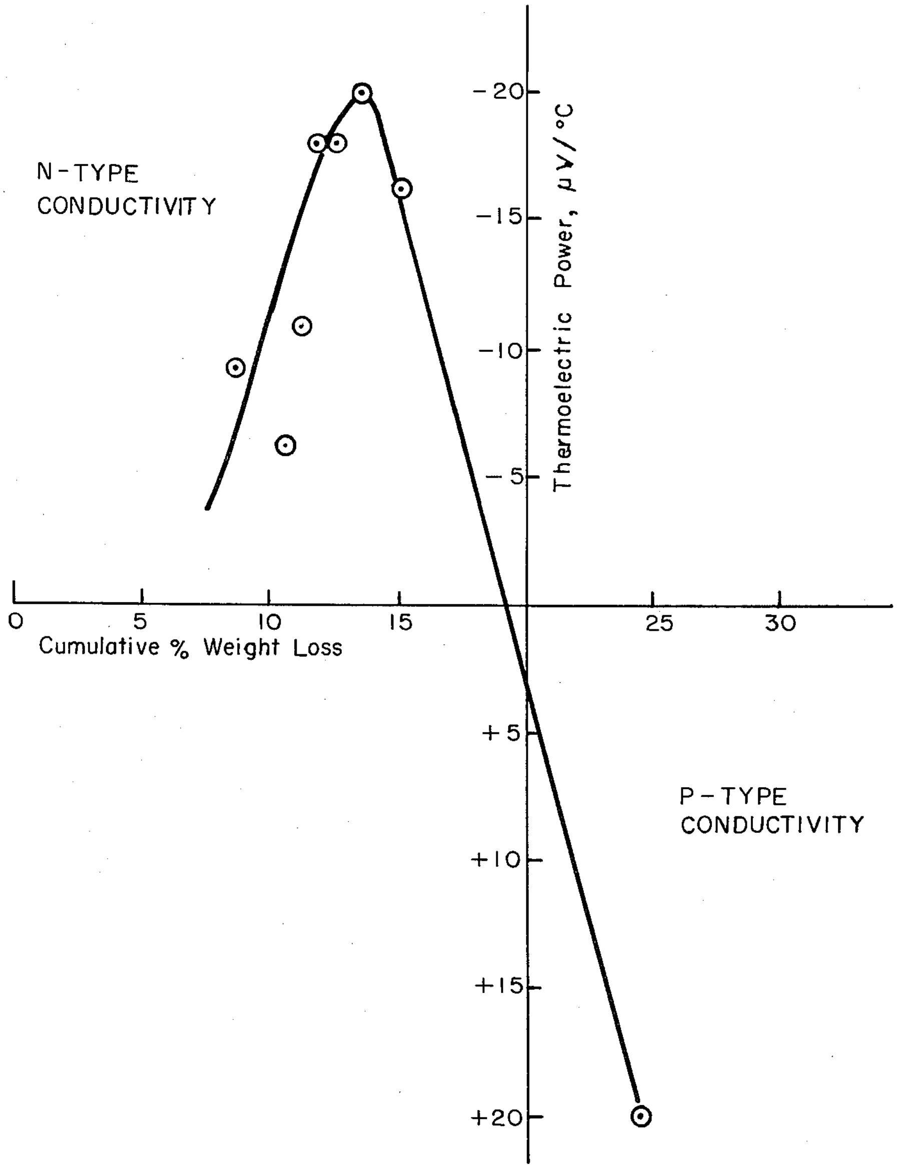
FIGURE 4 is a graph of thermoelectrical property of pyrolyzed pelleted pyromellitonitrile/methanol reaction products versus cumulative percent weight loss of the material as a result of the pyrolysis.

From the data of Table I the graph of FIGURE 4 was plotted. It should be noted that by the heat treatment of the pyrolyzed pyromellitonitrile/methanol reaction product, pellets or discs of material have been produced which have N-type conductivity under more mild conditions of heat treatment and P-type conductivity after the sample has been treated at high temperatures for long periods of time. The graph of FIGURE 4 is a plot of thermoelectric effect or power (TEP) in microvolts per degree centigrade versus the cumulative percent weight loss of the sample from the heat treating. Thus by the heat treatment samples of both N-type and P-type bodies have been made to provide the active ingredient for the thermoelectric cooling or generating apparatus which will be described in detail with relation to FIGURES 1, 2 and 3 below. A thermoelectric generator or cooler can be formed by using, for example, an N-type body having a thermoelectric power of about 20 $\mu$v./° C. and a P-type body having a thermoelectric power of about +20 $\mu$v./° C. Samples having such thermoelectric powers have been made as indicated by the data of FIGURE 4 and Table I.

FIGURE 1 broadly embodies a thermoelectric device which can be either a thermoelectric generator or a thermoelectric cooling device depending on the designation of certain of the components. For the thermoelectric generating device a body 11 in the form of an N-type wafer or disc of pyrolyzed pyromellitonitrile/methanol reaction product is used, and body 12 is a P-type wafer of pyrolyzed pyromellitonitrile/methanol reaction product. Electrodes leading from the tops of the discs 11 and 12 are numbered 19 and 20, and these electrodes can be copper, aluminum or other suitable conductors. Ohmic contact can be made between discs 11 and 12 and electrodes 19 and 20, respectively, by coating the upper surface of the discs with silver or other noble metal and soldering the electrodes thereto, with, e.g., a lead-tin eutectic alloy having some cadmium therein. The coating of silver, for example, can be applied to the top of the discs by evaporation of the silver on to the disc tops or alternatively with silver paint, which is commercially available. The other ends of the electrodes 19 and 20 are then connected by soldering or other suitable mechanical means to cold junction body 21, which is a copper or aluminum rectangular plate. The hot junctions of the device consist of copper or aluminum bodies 13 and 14, which are suitably in the form of rectangular plates and are electrically connected to discs 11 and 12 in a similar manner as were electrodes 19 and 20.

Discs 11 and 12 can be enclosed in glass shells 27 and 28, which are sealed to the hot junction bodies 13 and 14 which are rectangular copper or aluminum plates by metal to glass seals 15 and 17. These metal seals for use in sealing metal to glass, i.e., making metal to glass junction seals, are well known and commercially available. Similar metal seals 16 and 18 are used to seal the glass envelope to electrodes 19 and 20. Glass seals such as have been proposed can be used where it is desirable to encapsulate the discs for one reason or another. Thus the discs 11 and 12 or one of them can be surrounded by any desired atmosphere, inert or otherwise, or by high vacuum, if desired.

If the device of FIGURE 1 is to be a thermoelectric generating device, elements 22 and 23 are some sort of heating source, such as a heating jacket, gas burners, etc. It is desirable although not mandatory that the cold junction 21 have the heat removed therefrom by a cooling jacket 30, which is attached to plate 21. Cooling fluid, for example, water is circulated through jacket 30 to remove the heat transmitted by the hot junctions to plate 21. Suitably also, plate 21 is cooled by forced drafts of air as by a fan blowing over the surface of plate 21. With such an arrangement as this, i.e., heated plates 13 and 14 and cooled plate 21, a thermoelectric current will be generated in discs 11 and 12, and if 26 is a load such as a radio receiver, a storage battery to be charged, a microswitch or other type of switch to be operated, or other electrical device, power will be provided to operate the electrical device. The positive and negative terminals of the device are indicated in FIGURE 1 at opposite ends of load 26. Voltage generated can be increased by connecting a number of such N-type and P-type bodies in series. For increased current flow, a number of the bodies are connected in parallel.

If instead of a load 26, a battery 26 or other direct current source of electricity is connected with positive and negative terminals as indicated in FIGURE 1, a thermoelectric cooling system results. In this system the cold junction will be plate 21 and the hot junctions plates 13 and 14. In a refrigerating apparatus, for example, or for that matter in other cooling devices, it is desirable for maximum heat removal from the hot junctions to add cooling fins to plates 13 and 14. Also, suitable heat transfer fins are added to plate 21 to absorb heat and transmit it to plate 21. For use in refrigeration cold junction 21 would, of course, be positioned within the compartment or area to be cooled, whereas the hot junctions would be positioned outside of the area being cooled. A number of the devices of FIGURE 1 could be electrically connected in parallel or in series as would be most appropriate to increase the cooling surface and capacity.

Figure 2:
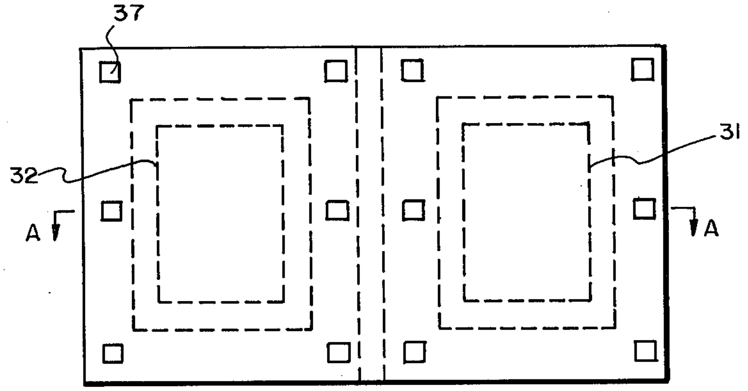
FIGURE 2 is a top view of another embodiment of the invention.

FIGURES 2 and 3 show another embodiment of the invention. Bodies 31 and 32 suitably in the form of rectangular plates are P-type and N-type pyrolyzed pyromellitonitrile/methanol reaction product, respectively. Body 34 suitably a copper or aluminum rectangular plate serves as the cold junction for the device, being bonded to plates 31 and 32 in a similar manner to that described in FIGURE 1. The hot junction bodies 35 and 36 suitably copper or aluminum plates are in a like fashion electrically connected to discs 31 and 32 to form ohmic junctions therewith. Gasket 33 is normally preferably made of an inorganic material such as glass, mica, or other materials which will withstand high temperatures, if the thermoelectric device is to be subjected to high temperature. If the device is not to be subjected to high temperatures, rubber or other similar gaskets can be used. Gasket 33 serves as an insulating separator between plates 34 and 35 and 36, and also serves to enclose on the sides thermoelectric discs 31 and 32. Thus with the metal plates 34, 35 and 36, and the gasket 33, plates 31 and 32 are encapsulated in separate compartments surrounded on the sides by vapor spaces. To prevent electrical short-circuiting of the device bolts and nuts 37 must be insulated from metal plates 34, 35 and 36 by electrical insulating washers and sleeves made of conventional materials such as rubber or inorganic materials described above. if the device is to be used at high temperatures.

As in FIGURE 1, if the device is a thermoelectric generator, it is necessary to have a heating means 39 which can be the same as described in FIGURE 1 for heating hot juntcions which are plates 35 and 36, and it is desirable for maximum efficiency although not mandatory that cold junction plate 34 be cooled by conventional means 38 such as are described with respect to FIGURE 1. Leads 40 and 41 connect electrically hot junction plates 35 and 36 with a load 42, which can suitably be the same type of load as employed in the thermoelectrical generator of FIGURE 1.

If the device of FIGURES 2 and 3 is used as a thermoelectric cooling device, it is desirable to attach fins to hot junctions 35 and 36. It is also desirable to employ a blower or other cooling device 39 for the purpose of aiding the removal of heat from the hot junctions. Likewise it is desirable to employ cooling fins attached to cold junction 34 for gathering heat from the enclosure which is being cooled and conducting it to the cold junction. A D.C. voltage source 42 such as a battery is connected in the circuit as indicated by the plus and minus terminals on FIGURE 3 to serve as the source of power to operate the cooling device.

As in the case of the device of FIGURE 1 whether used for electrical power generation or cooling, a number of the devices of FIGURES 2 and 3 can suitably be electrically connected in parallel or series.

If the thermoelectric discs are not enclosed in housings such as in FIGURE 1 and FIGURES 2 and 3, it will be desirable in some cases to encapsulate the discs except at the electrode connections, for example, by covering the discs with a protective film of silicone varnish, glass, plastic resin, etc.

In the devices of FIGURES 1–3, either the N-type bodies or the P-type body of pyrolyzed pyromellitonitrile/methanol reaction product can be replaced by another N-type or P-type body, e.g. N-type bismuth telluride or P-type bismuth telluride could be used. Other N-type or P-type thermoelectric bodies either organic or inorganic can be used in conjunction with a P-type or an N-type pyrolyzed body of pyromellitonitrile/methanol or other lower alkyl alcohol reaction product.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A thermoelectric device comprising an N-type thermoelectric element and a P-type thermoelectric element with electrical connections joining said elements and other electrical connections to said elements, provided at least one of said elements is made by the process comprising: (1) heating at at least reflux temperatures a mixture of pyromellitronitrile and a lower alkyl alcohol to form a reaction product having substantially 2 moles of alcohol per mole of pyromellitonitrile, (2) separating said reaction product from the reaction mixture, (3) forming an element under pressure from said separated reaction product, and (4) heating said formed element at a temperature in the range of about 160 to about 700° C. for a time sufficient to produce the desired thermoelectric element.

2. The device of claim 1 wherein said lower alkyl alcohol is methanol.

3. A thermoelectric cooling device comprising an N-type element and a P-type element, electrical connections joining said elements, and other electrical connections for joining said elements through a direct current source with the positive terminal of said source to be connected to said N-type element and the negative terminal of said source to be connected to said P-type element, provided at least one of said elements is made by the process comprising: (1) heating at at least reflux temperatures a mixture of pyromellitonitrile and methanol to form a reaction product having substantially 2 moles of methanol per mole of pyromellitonitrile, (2) separating said reaction product from the reaction mixture, (3) forming an element under pressure from said separated reaction product, and (4) heating said formed element at a temperature in the range of about 160 to about 700° C. for a time sufficient to produce the desired thermoelectric element.

4. The device of claim 3, wherein a metal element for heat transfer electrically joins said N- and P-type elements, and other metal elements for heat transfer are to be connected in series electrically between said N- and P-type elements and said direct current source.

5. The device of claim 3, wherein both of said N- and P-type elements are made by said process.

6. A thermoelectric generating device comprising an N-type element and a P-type element, electrical connections joining said elements, other electrical connections for joining said elements through an electrical load, and means for associating a heating source associated with a pair of the portions of said elements, provided at least one of said elements is made by the process comprising: (1) heating at at least reflux temperatures a mixture of pyromellitonitrile and methanol to form a reaction product having substantially 2 moles of methanol per mole of pyromellitonitrile, (2) separating said reaction product from the reaction mixture, (3) forming an element under pressure from said separated reaction product, and (4) heating said formed element at a temperature in the range of about 160 to about 700° C. for a time sufficient to produce the desired thermoelectric element.

7. The device of claim 6, wherein said heating source is to be associated with the pair of connected portions of said elements to be connected with said load.

8. The device of claim 7, wherein means is provided for associating a cooling source with the pair of portions of said elements connected directly together electrically.

9. The device of claim 7, wherein a metal element for heat transfer directly joins electrically said N-type and P-type elements, and metal for heat transfer are provided to be connected in series electrically between said N- and P-type elements and said load.

10. The device of claim 7, wherein both of said N- and P-type elements are made by said process.

References Cited in the file of this patent

Eley: Organic Semiconductors, Research (London), volume 12, 1959, pages 293–299.